(12) United States Patent
Swain

(10) Patent No.: US 9,053,267 B2
(45) Date of Patent: Jun. 9, 2015

(54) NOISE ANALYSIS USING TIMING MODELS

(75) Inventor: Rabi Swain, County Cork (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/335,320

(22) Filed: Dec. 22, 2011

(65) Prior Publication Data

US 2013/0167099 A1 Jun. 27, 2013

(51) Int. Cl.
G06F 17/50 (2006.01)

(52) U.S. Cl.
CPC ........ *G06F 17/5031* (2013.01); *G06F 2217/82* (2013.01)

(58) Field of Classification Search
CPC ............ G06F 17/5009; G06F 17/5022; G06F 17/5031; G06F 17/5036; G06F 17/5045; G06F 17/5059; G06F 17/5082; G06F 17/5084

USPC .................. 716/106, 108, 113–115, 134, 136
See application file for complete search history.

(56) References Cited

U.S. PATENT DOCUMENTS

| | | | |
|---|---|---|---|
| 6,915,249 B1* | 7/2005 | Sato et al. ........................ | 703/14 |
| 8,205,181 B1* | 6/2012 | Singla et al. ................... | 716/113 |
| 8,443,321 B1* | 5/2013 | Fender et al. .................. | 716/111 |
| 2003/0079191 A1* | 4/2003 | Savithri et al. .................... | 716/4 |
| 2004/0034840 A1* | 2/2004 | Chen ................................ | 716/6 |
| 2006/0288320 A1* | 12/2006 | Murgai et al. ..................... | 716/6 |
| 2010/0229136 A1* | 9/2010 | Gandikota et al. ................ | 716/6 |

* cited by examiner

*Primary Examiner* — Paul Dinh
(74) *Attorney, Agent, or Firm* — Schwegman Lundberg & Woessner, P.A.

(57) ABSTRACT

Various embodiments include apparatuses and methods to perform noise analysis on a circuit at a selected condition (e.g., process, voltage, and temperature) using a timing model of the circuit in which the timing model is associated with the selected condition.

17 Claims, 5 Drawing Sheets

FIG. 2A

| TIMING MODEL OF CIRCUIT UNIT 100 — 201A | | |
|---|---|---|
| PROCESS | VOLTAGE | TEMP |
| P1 | V1 | T1 | ← 211

FIG. 2B

| TIMING MODEL OF CIRCUIT UNIT 100 — 201B | | |
|---|---|---|
| PROCESS | VOLTAGE | TEMP |
| P2 | V2 | T2 | ← 212

FIG. 2C

| TIMING MODEL OF CIRCUIT UNIT 100 — 201C | | |
|---|---|---|
| PROCESS | VOLTAGE | TEMP |
| P3 | V2 | T2 | ← 213

FIG. 2D

| TIMING MODEL OF CIRCUIT UNIT 100 — 201D | | |
|---|---|---|
| PROCESS | VOLTAGE | TEMP |
| P1 | V3 | T2 | ← 214

FIG. 4A — 401A: TIMING MODEL OF CIRCUIT UNIT 301

| PROCESS | VOLTAGE | TEMP |
|---------|---------|------|
| P1 | V1 | T1 ← 411 |

FIG. 4B — 401B: TIMING MODEL OF CIRCUIT UNIT 301

| PROCESS | VOLTAGE | TEMP |
|---------|---------|------|
| P2 | V2 | T2 ← 412 |

FIG. 4C — 402A: TIMING MODEL OF CIRCUIT UNIT 302

| PROCESS | VOLTAGE | TEMP |
|---------|---------|------|
| P1 | V1 | T1 ← 411 |

FIG. 4D — 402B: TIMING MODEL OF CIRCUIT UNIT 302

| PROCESS | VOLTAGE | TEMP |
|---------|---------|------|
| P2 | V2 | T2 ← 412 |

FIG. 4E — 403A: TIMING MODEL OF CIRCUIT UNIT 303

| PROCESS | VOLTAGE | TEMP |
|---------|---------|------|
| P1 | V1 | T1 ← 411 |

FIG. 4F — 403B: TIMING MODEL OF CIRCUIT UNIT 303

| PROCESS | VOLTAGE | TEMP |
|---------|---------|------|
| P2 | V2 | T2 ← 412 |

NOISE ANALYSIS USING TIMING MODELS

FIELD

Embodiments described herein relate to electrical circuits. Some embodiments relate to circuit design and simulations.

BACKGROUND

Circuits reside in many electronic products to perform specific operations. Variations in parameters such as fabricating process, voltage, and temperature may affect operations of such circuits. Designers often analyze (e.g., by simulation) these circuits at different operating conditions (e.g., different voltages, temperatures, or both) to ensure circuit operations meet design specifications. Inaccurate analysis of these circuits may lead to inferior products or may cause product operational failures at some operating conditions.

BRIEF DESCRIPTION OF DRAWINGS

FIG. 2A, FIG. 2B, FIG. 2C, and FIG. 2D are charts showing information associated with different timing models of the circuit unit of FIG. 1, according to some embodiments described herein.

FIG. 4A through FIG. 4F are charts showing information associated with different timing models of respective circuit units of the circuit of FIG. 3, according to some embodiments described herein.

DETAILED DESCRIPTION

Figure 1:
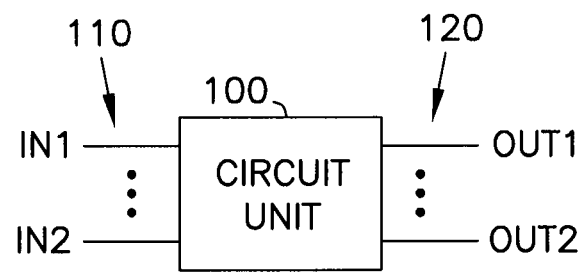
FIG. 1 shows a block diagram of a circuit unit, according to some embodiments described herein.

FIG. 1 shows a block diagram of a circuit unit 100 having nodes (e.g., inputs) 110 and nodes (e.g., outputs) 120. Circuit unit 100 may include only a single circuit component or a group of components. For example, circuit unit 100 may include a transistor, an inverter, a logic gate, a functional block in chip. Nodes 110 and 120 may include internal nodes in circuit unit 100 or external nodes (e.g., conductive contacts, such as balls or pins) of circuit unit 100.

Circuit unit 100 may use nodes 110 to receive signals (e.g., input signals) IN1 and IN2 and nodes 120 to provide signals (e.g., output signals) OUT1 and OUT2. Signals OUT1 and OUT2 may be related to signals IN1 and IN2, respectively. For example, the values (e.g., signal levels) of signals OUT1 and OUT2 may depend on the values of signals IN1 and IN2, respectively.

During a designing phase of a device or a system that includes circuit unit 100, different types of analysis may be performed on circuit unit 100. For example, timing analysis and noise analysis may be performed on circuit unit 100.

Performing timing analysis on circuit unit 100 may include determining a time delay of signals (e.g., IN1, IN2, OUT1, and OUT2) associated with operations of circuit unit 100. For example, timing analysis on circuit unit 100 may provide information (e.g., a timing report) about time delay of signals at nodes 120 relative to the timing of signals (e.g., IN1 and IN2) at nodes 110.

Performing noise analysis on circuit unit 100 may include determining whether noise may be introduced to signals (e.g., IN1, IN2, OUT1, and OUT2) in circuit unit 100 during operations of circuit unit 100. For example, noise analysis may provide information (e.g., a noise report) about noise of conductors (e.g., signal paths) coupled to nodes 110 and 120. Such noise may include crosstalk generated by signals on adjacent conductors.

Each of timing analysis and noise analysis may be performed at different conditions, such as at different sets of process (e.g., fabricating process), voltage, and temperature. Timing analysis and noise analysis, as described above, may be performed by software (e.g., software simulation).

FIG. 2A, FIG. 2B, FIG. 2C, and FIG. 2D are charts showing information associated with different timing models 201A, 201B, 201C, and 201D of circuit unit 100 of FIG. 1. Timing models 201A, 201B, 201C, and 201D may be generated by or included in software (e.g., simulation software) based on an actual circuit unit 100. Timing models 201A, 201B, 201C, and 201D may be used (e.g., used in a software timing simulator) during timing analysis of circuit unit 100 (FIG. 1).

In FIG. 2A, FIG. 2B, FIG. 2C, and FIG. 2D, process, voltage, and temperature represent parameters included in the information associated with each of timing models 201A, 201B, 201C, and 201D of circuit unit 100 (FIG. 1). Each of the process, voltage, and temperature parameters may have different values. For example, the process may include process values P1, P2, and P3. The voltage may include voltage values V1, V2, and V3. The temperature may include temperature values T1 and T2. FIG. 2A, FIG. 2B, FIG. 2C, and FIG. 2D show an example of three process values, three voltage values, and two temperature values. The number of values in each of the process, voltage, and temperature may vary.

Each of process values P1, P2, and P3 may represent variations in fabricating processes (e.g., process corners) of the same circuit unit (e.g., circuit unit 100 (FIG. 1)) at which components (e.g., transistors) of the actual circuit unit may behave differently from a process having a process value (e.g., P1) to a process having another process value (e.g., P2). For example, a transistor in a process having process value P1 may operate (e.g., switch a signal) at a higher speed than a transistor in a process having process value P2, and a transistor in a process having process value P3 may operate at a lower speed than a transistor in process having process value P2.

Voltage values V1, V2, and V3 may include different values, for example, 0.9 volts (V), 1.05V, and 1.35V, respectively. These voltage values V1, V2, and V3 may be selected at different times during different testing (e.g., simulation) of circuit unit 100 (FIG. 1) to determine the behaviors (e.g., timing of signals) of circuit unit 100 at different voltages.

Temperature values T1 and T2 may include different values, for example, zero degrees centigrade (0° C.) and 110° C., respectively. These temperature values T1 and T2 may be selected at different times during testing (e.g., simulation) to determine the behaviors of circuit unit 100 (FIG. 1) at different temperatures.

FIG. 2A, FIG. 2B, FIG. 2C, and FIG. 2D show different conditions 211, 212, 213, and 214 associated with their respective timing models 201A, 201B, 201C, and 201D. A different combination of process value, voltage value, and temperature value may be selected to create a different condition at which circuit unit 100 (FIG. 1) may be tested (e.g., simulated). For example, as shown in FIG. 2A, condition 211 may be created from a combination of process value P1, voltage value V1, and temperature T1. As shown in FIG. 2B, condition 212 may be created from a combination of process value P2, voltage value V2, and temperature T2. As shown in FIG. 2C, condition 213 may be created from a combination of process value P3, voltage value V2, and temperature T2. As shown in FIG. 2D, condition 214 may be created from a combination of process value P1, voltage value V3, and temperature T2. Conditions 211, 212, 213, and 214 may also be referred to as PVT corners. Additional conditions (e.g., additional PVT corners) associated with timing models for circuit unit 100 (FIG. 1) may be created using additional combinations of process value, voltage value, and temperature.

In the example associated with FIG. 2A, FIG. 2B, FIG. 2C, and FIG. 2D, the timing analysis for circuit unit 100 (FIG. 1) may be performed for all or fewer than all of conditions 211, 212, 213, and 214 by using corresponding timing models 201A, 201B, 201C, and 201D. For example, timing analysis for circuit unit 100 (FIG. 1) may be performed at condition 211 (e.g., using timing model 201A) at one time and performed at condition 212 (e.g., using timing model 201B) at another time.

Since timing models 201A, 201B, 201C, and 201D are associated with different conditions 211, 212, 213, and 214, different timing analysis for circuit unit 100 (FIG. 1) (based on different timing models 201A, 201B, 201C, and 201D) may generate different timing analysis results (e.g., timing reports). Such results may provide information about timing of the signals associated with circuit unit 100. For example, the results from each timing analysis may provide timing values of signals (IN1, IN2, OUT1, and OUT2 in FIG. 1) associated with circuit unit 100. The timing values may include time delay values. Thus, different timing analysis may provide different timing values (e.g. different time delay values) of signals associated with circuit unit 100. A time delay value in timing analysis may include a response time of a signal (e.g., OUT1) at nodes 120 relative to a transition of a signal (e.g., IN1) at nodes 110.

One of conditions 211, 212, 213, and 214 may be identified as a worst-case condition (e.g., worst-case corner) for timing of circuit unit 100 (FIG. 1) based on the timing analysis results obtained from different timing analysis using timing models 201A, 201B, 201C, and 201D. For example, condition 212 may be identified as the worst-case condition for timing of circuit unit 100 if timing analyses for circuit unit 100 are performed at all four conditions 211, 212, 213, and 214 (using respective timing models 201A, 201B, 201C, and 201D) and if timing analysis reports using timing model 201B (associated with condition 212) provide a time delay value that is greatest in comparison with time delay values in timing analysis results using timing models 201A, 201C, and 201D.

Figure 3:
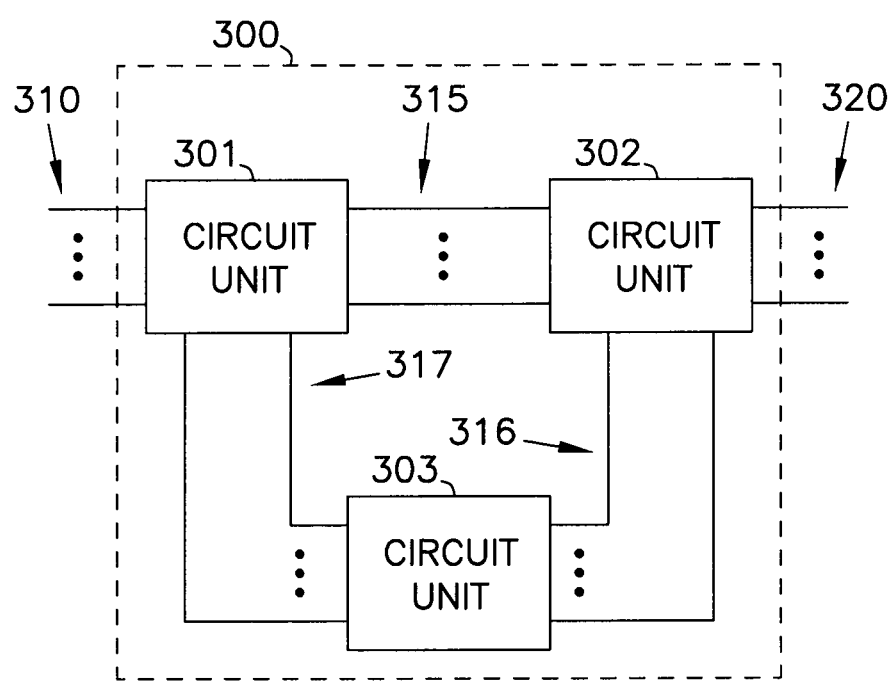
FIG. 3 shows a block diagram of a circuit including circuit units, according to some embodiments described herein.

FIG. 3 shows a block diagram of a circuit 300 including circuit units 301, 302, and 303. Each of circuit units 301, 302, and 303 may include circuit unit 100 of FIG. 1. Circuit 300 in FIG. 3 may be included in a semiconductor chip. For example, circuit 300 may include all or a majority of components of a processor, a memory device, or combination of both in a semiconductor chip. Thus, circuit 300 may occupy a majority of the area in a semiconductor chip or occupy the full area of processing circuitry of a semiconductor chip. Circuit 300 may occupy an entire area of a semiconductor chip. As shown in FIG. 3, circuit 300 may include nodes (e.g., inputs and outputs) 310, 315, 316, 317, and 320 associated with circuit units 301, 302, and 303 to receive and provide signals.

FIG. 4A through FIG. 4F are charts showing information associated with different timing models 401A, 401B, 402A, 402B, 403A, and 403B of respective circuit units 301, 302, and 303 of circuit 300 of FIG. 3. Timing models 401A, 401B, 402A, 402B, 403A, and 403B may be generated by or included in software (e.g., simulation software) based on corresponding actual circuit units 301, 302, and 303 (FIG. 3). For example, in FIG. 4A and FIG. 4B, timing models 401A and 401B may be generated based on circuit unit 301. In FIG. 4C and FIG. 4D, timing models 402A and 402B may be generated based on circuit unit 302. In FIG. 4E and FIG. 4F, timing models 403A and 403B may be generated based on circuit unit 303. FIG. 4A through FIG. 4F show an example of two timing models associated with two respective conditions 411 and 412 for each circuit unit. Each of circuit units 301, 302, and 303, however, may include more than two timing models. For example, each of circuit units 301, 302, and 303 may include four timing models associated with four different conditions similar to those (FIG. 2A through FIG. 2D) of circuit unit 100 (FIG. 1).

As shown in FIG. 4E and FIG. 4F, each of conditions 411 and 412 may be created from a different combination of process value, voltage value, and temperature value. For example, condition 411 may be created from a combination of process value P1, voltage value V1, and temperature value T1. Condition 412 may be created from a combination of process value P2, voltage value V2, and temperature value T2. Voltage values V1 and V2 may be different from each other. For example, voltage value V2 may be less than voltage V1. Temperature values T1 and T2 may be equal to each other.

As described above with reference to FIG. 2A through FIG. 2F, one of the conditions (condition 212 in FIG. 2B) associated with timing models (e.g., 201B in FIG. 2B) may be identified as a worst-case condition (e.g., worst-case corner) for timing of circuit unit 100 (FIG. 1) based on the timing analysis results obtained from timing analysis using such timing models. Similarly, in FIG. 4A through FIG. 4F, condition 412 may be identified as the worst-case condition for timing for each of circuit units 301, 302 and 303 based on timing analysis results obtained from performing timing analysis using all (e.g., two or more) timing models of each circuit unit at all (e.g., two or more) conditions including conditions 411 and 412.

Figure 5:
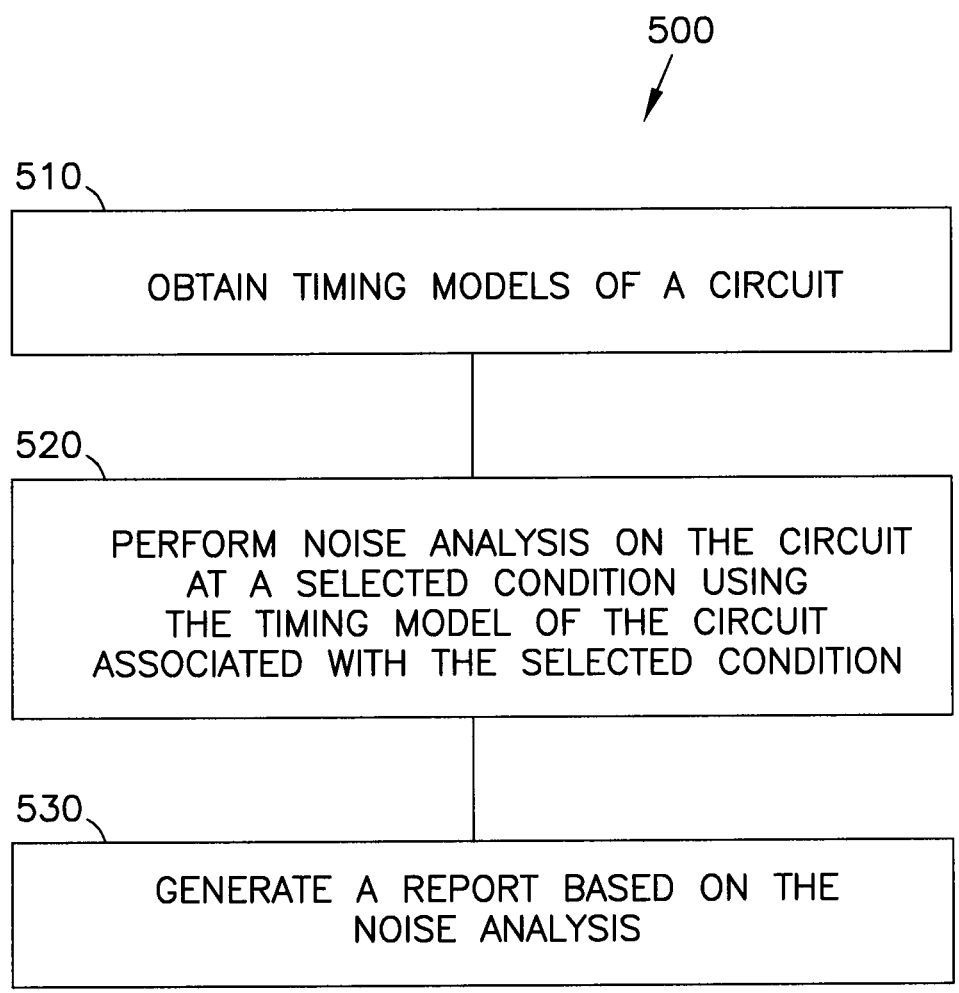
FIG. 5 is a flowchart illustrating a method to perform noise analysis, according to some embodiments described herein.

FIG. 5 is a flowchart illustrating a method 500 to perform noise analysis on circuit 300 of FIG. 3. Method 500 may be performed by using software (e.g., simulation software) on a machine, such as a computer. Timing models 401A, 401B, 402A, 402B, 403A, and 403B (FIG. 4A through FIG. 4F) may be used to perform noise analysis on circuit 300. For example, timing models 401A, 401B, 402A, 402B, 403A, and 403B may be used as input information provided to a software noise simulator to perform noise analysis on circuit 300.

Activity 510 of method 500 may include obtaining a timing model of circuit 300 (FIG. 3), such that the timing model of circuit 300 is associated with a selected condition at which noise analysis is to be performed. Such a condition may include a worst-case condition for noise in circuit 300. Worst-case for noise in circuit 300 may be determined before activity 510 is performed. For example, information acquired from testing of circuit 300 (e.g., by simulation or by testing the actual circuit) at different conditions (e.g., different combinations of process value, voltage value, and temperature value) for noise only may determine which of those conditions is the worst-case condition for noise that may occur in circuit 300.

A timing model of circuit 300 (FIG. 3) obtained in activity 510 may include a combination of timing models of circuit units 301, 302, and 303 (FIG. 3). For example, the timing model of circuit 300 used in activity 510 may include a combination of timing models 401A, 402A, and 403A (FIG.

4A, FIG. 4C, and FIG. 4E) or combination of timing models 401B, 402B, and 403B (FIG. 4B, FIG. 4D, and FIG. 4F). To obtain a timing model of circuit 300, activity 510 may select timing models associated with the selected condition at which noise analysis is to be performed. Thus, activity 510 may select the combination of timing models 401A, 402A, and 403A (FIG. 4A, FIG. 4C, and FIG. 4E) if the selected condition used for noise analysis includes process value P1, voltage value V1, and temperature T1 (which is condition 411 (FIG. 4)). Activity 510 may select the combination of timing models 401B, 402B, and 403B (FIG. 4B, FIG. 4D, and FIG. 4F) if the selected condition used for noise analysis includes process value P2, voltage value V2, and temperature T2 (which is condition 412 (FIG. 4)).

In FIG. 5, activity 520 may include performing noise analysis on circuit 300 (FIG. 3) at the selected condition (e.g., worst-case condition for noise) using a timing model of circuit 300 which includes a combination of the timing models of circuit units 301, 302, and 303 (FIG. 3) associated with the same selected condition. For example, if the selected condition includes a combination of process value P1, voltage value V1, and temperature T1, then to perform noise analysis at that selected condition (e.g., P1, V1, and T1), activity 520 may use timing models of circuit units 301, 302, and 303 associated with conditions including the same combination of process value P1, voltage value V1, and temperature T1. Thus, in this example, activity 520 may use timing models 401A (FIG. 4A), 402A (FIG. 4C), and 403A (FIG. 4E) to perform the noise analysis on circuit 300 because these timing models 401A, 402A, and 403A are associated with condition including process value P1, voltage value V1, and temperature T1 (which is condition 411 (FIG. 4)).

Activity 530 may include generating a noise analysis report based on the noise analysis performed in activity 520. Each of circuit units 301, 302, and 303 (FIG. 3) and corresponding timing models 401A (FIG. 4A), 402A (FIG. 4C), and 403A (FIG. 4E) may include a conductive path to carry signals. The noise analysis report may include information indicating whether a noise violation may occur in any segments of such conductive paths. Noise, as described herein, may include crosstalk (e.g., a glitch) between adjacent conductive paths. For example, during noise analysis in activity 520, a glitch (e.g., an undesired momentary signal spike) may occur in a conductive path. Such a glitch may be caused by a valid transition of signal on an adjacent conductive path. In this example, the noise analysis report generated in activity 530 may include information related to such a glitch in terms of the noise immunity of circuit units 301, 302, and 303 (FIG. 3), their respective driver resistances and propagated noise.

The noise analysis report may indicate (e.g., in a list in the report) such a glitch in the above example as a noise violation if the glitch exceeds a value, such as a known value below which the glitch may be acceptable. Each input can tolerate a certain amount of noise without causing a failure at the output. Based on the noise analysis report, correction to remove any noise violations may be made to circuit 300 (FIG. 3). This may be done, for example, by accurately modeling the steady-state I-V (current-voltage) characteristics of the output drivers in each of circuit units 301, 302 and 303 (FIG. 3) and by accurately propagating the cross-talk to the next circuit element as noise bump.

In method 500, a condition having a combination of process value P1, voltage value V1, and temperature T1, as described above in activities 510 and 520, may be determined to be the worst-case condition for noise in circuit 300 (FIG. 3). Thus, the noise analysis report generated in activity 530 may include information about noise violations at the worst-case condition in circuit 300.

The worst-case condition for noise in circuit 300 (FIG. 3) in method 500 may be different from the worst-case condition for timing of circuit 300. For example, as described above with reference to FIG. 4A through FIG. 4F, condition 412 may be the worst-case condition for timing. The worst-case condition for noise in circuit 300 may correspond to a condition having a combination of process value P1, voltage value V1, and temperature T1. In method 500, performing noise analysis on circuit 300 at a selected condition using circuit timing models (e.g., models 401A, 402A, and 403A (FIG. 4)) associated with the same selected condition (e.g., condition 411 (FIG. 4), which may not be the worst-case condition for timing for circuit 300) may improve the accuracy of the noise analysis for worst-case noise in circuit 300. Further, performing noise analysis at a selected condition (e.g., condition including P1, T1, and V1) using timing models associated with the same condition may avoid impacting the timing closure (e.g., at full chip level or cluster levels) of circuit 300.

Figure 6:
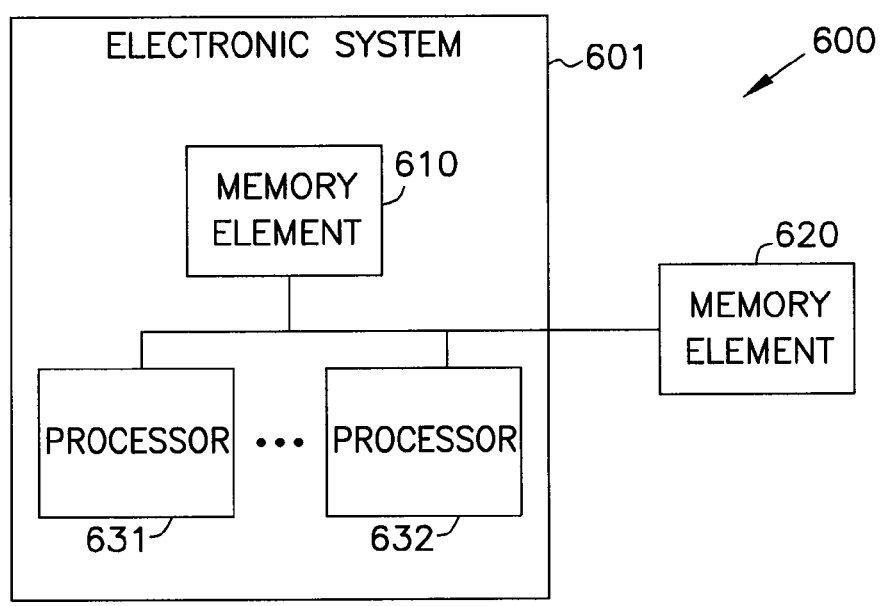
FIG. 6 shows a block diagram of an apparatus including memory elements, according to some embodiments described herein.

FIG. 6 shows a partial block diagram of an apparatus 600 including memory element 610 and memory element 620. Apparatus 600 may include an electronic system 601, which may include a personal computer (PC) or other electronic products. Electronic system 601 may include a simulator or may be used as a simulator to perform analysis (e.g., timing analysis and noise analysis as described above with reference to FIG. 1 through FIG. 5). As shown in FIG. 6, electronic system 601 may also include one or more processors 631 and 632 to process information that may be provided by one or both of memory elements 610 and 620.

Memory elements 610 and 620 may store information (e.g., data including timing models) such that memory element 610, memory element 620, or both may be configured to be accessible to provide such information in a simulation of a circuit unit (e.g., 100 of FIG. 1) or a circuit (e.g., 300 of FIG. 3). Such a simulation may include performing timing analysis and noise analysis as described above with reference to FIG. 1 through FIG. 5. A user may interact with the simulator in electronic system 601 to perform such timing analysis and noise analysis.

Memory elements 610 and 620 may include non-volatile memory, volatile memory, or a combination of both. For example, memory elements 610 and 620 may include a dynamic random access memory (DRAM) device, a static random access memory (SRAM) device, a flash memory device, an electrically erasable programmable read only memory (EEPROM) device, a magnetic memory (e.g., a hard drive) device, an optical memory device (e.g., CD-ROM or DVD), or a combination of these memory devices, or other types of memory devices. In some cases, memory element 620 may include a CD-ROM or a DVD and memory element 610 may include a combination of DRAM, SRAM, flash, and magnetic memory devices. FIG. 6 shows apparatus 600 with both memory elements 610 and 620 as an example. Apparatus 600, however, may omit one of memory elements 610 and 620.

Each of memory elements 610 and 620 may also include (e.g., store) instructions (e.g., software instructions) to operate on the information stored thereon including information on timing models of circuit units, such as timing models 201A, 201B, 201C, and 201D (FIG. 2A through FIG. 2D) and timing models 401A, 401B, 402A, 402B, 403A, and 403B (FIG. 4A through FIG. 4F). One or more of processors 631 and 632 may use information stored in one or both of memory elements 610 and 620 during an operation such as performing timing analysis and noise analysis as described above with reference to FIG. 1 through FIG. 5. Thus, each of memory elements 610 and 620 may also be viewed as a machine-readable storage medium comprising instructions, which when implemented by one or more processors (such as one or more of processors 631 and 632) perform one or more operations. The operation (or operations) may include performing timing analysis, noise analysis, or both, as described above with reference to FIG. 1 through FIG. 5.

The illustrations of apparatuses (e.g., circuit unit 100 and circuit 300 (FIG. 1 and FIG. 3)) and methods (e.g., operations associated with timing or noise analysis associated with circuit unit 100 and circuit 300) are intended to provide a general understanding of the structure of various embodiments and are not intended to provide a complete description of all the elements and features of apparatuses that might make use of the structures described herein.

Circuit unit 100 and circuit 300 (FIG. 1 and FIG. 3) may be included in apparatuses (e.g., electronic circuitry) such as high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 5) players), vehicles, medical devices (e.g., heart monitor, blood pressure monitor, etc.), set top boxes, and others.

The embodiments described above with reference to FIG. 1 through FIG. 6 include apparatuses and methods to obtain a timing model of a circuit. Such a timing model may be associated with a selected condition. Such apparatuses and methods may also perform noise analysis on the circuit at the selected condition using the timing model associated with the selected condition. Other embodiments including additional apparatuses and methods are described.

The above description and the drawings illustrate some embodiments to enable those skilled in the art to practice the embodiments of the inventions. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description. Therefore, the scope of various embodiments of the invention is determined by the appended claims, along with the full range of equivalents to which such claims are entitled.

The Abstract is provided to comply with 37 C.F.R. §1.72(b) requiring an abstract that will allow the reader to quickly ascertain the nature and gist of the technical disclosure. The Abstract is submitted with the understanding that it will not be used to interpret or limit the scope or meaning of the claims.

What is claimed is:

1. A method comprising:
    obtaining a timing model of a circuit for performing noise analysis on the circuit, the timing model associated with a selected condition among a first condition and a second condition; and
    performing noise analysis, by using a processor, on the circuit at the selected condition using the timing model associated with the selected condition, wherein the selected condition includes the first condition, the first condition includes a first combination of fabricating process, voltage, and temperature, the first condition includes a worst-case condition for noise associated with the circuit, the worst-case condition for noise associated with the circuit is determined before the timing model is obtained, the second condition includes a worst-case condition for timing associated with the circuit, the second condition includes a second combination of fabricating process, voltage, and temperature, and wherein the first combination of fabricating process, voltage, and temperature is different from the second combination of fabricating process, voltage, and temperature.

2. The method of claim 1, wherein the timing associated with the circuit includes a time delay associated with a signal in the circuit.

3. The method of claim 2, wherein the noise associated with the circuit includes crosstalk associated with signals in the circuit.

4. The method of claim 1, further comprising:
    generating a report based on the noise analysis, wherein the report includes information indicating whether a noise violation occurs in the noise analysis.

5. The method of claim 1, wherein the selected condition includes a voltage value and a temperature value.

6. The method of claim 1, wherein obtaining the timing model of the circuit includes selecting a first timing model of a circuit unit included in the circuit, the first timing model of the circuit unit selected from multiple timing models of the circuit unit, the multiple timing models of the circuit unit including a second timing model of the circuit unit, the second timing model of the circuit unit associated with a condition including a voltage value and a temperature value, and wherein the voltage value of the condition associated with the second timing model of the circuit unit is less than the voltage value of the selected condition associated with the timing model of the circuit for performing noise analysis on the circuit.

7. The method of claim 6, wherein the condition associated with the second timing model of the circuit unit includes a worst-case condition for timing associated with the circuit unit.

8. The method of claim 6, wherein the temperature value of the condition associated with the second timing model of the circuit unit is equal to the temperature value of the selected condition.

9. The method of claim 8, wherein the circuit occupies a full area of a processing circuitry in a semiconductor chip.

10. An apparatus comprising:
    a memory element configured to store information associated with a first timing model of a circuit unit and a second timing model of the circuit unit, the first timing model of the circuit unit associated with a first condition, the second timing model of the circuit unit associated with a second condition, the first condition corresponding to a worst-case condition for noise in a circuit that includes the circuit unit, the first condition including a first combination of fabricating process, voltage, and temperature, the second condition corresponding to a worst-case condition for timing in the circuit, the second condition including a second combination of fabricating process, voltage, and temperature, wherein the first combination of fabricating process, voltage, and temperature is different from the second combination of fabricating process, voltage, and temperature, and wherein the memory element is configured to provide the first timing model of the circuit unit during a simulation of performing worst-case noise analysis of the circuit unit.

11. The apparatus of claim 10, wherein the memory element is configured to be accessible by a processor to provide the processor with information associated with the at least one of the first and second timing models in the simulation.

12. The apparatus of claim 10, further comprising at least one processor configured to access the memory element.

13. The apparatus of claim 10, wherein the memory element includes a non-volatile memory device.

14. The apparatus of claim 13, wherein the circuit occupies a majority area of a semiconductor chip.

15. A non-transitory machine-readable storage medium comprising instructions which, when implemented by one or more processors, perform the following operations:

obtaining a timing model of a circuit for performing noise analysis on the circuit, the timing model associated with a selected condition among a first condition and a second condition; and performing noise analysis, by using a processor, on the circuit at the selected condition using the timing model associated with the selected condition, wherein the selected condition includes the first condition, the first condition includes a first combination of fabricating process, voltage, and temperature, the first condition includes a worst-case condition for noise associated with the circuit, the worst-case condition for noise associated with the circuit is determined before the timing model is obtained, the second condition includes a worst-case condition for timing associated with the circuit, the second condition includes a second combination of fabricating process, voltage, and temperature, and wherein the first combination of fabricating process, voltage, and temperature is different from the second combination of fabricating process, voltage, and temperature.

16. The machine-readable storage medium of claim 15, wherein parameters associated with the selected condition used for performing the noise analysis are different from parameters associated with the worst-case condition for timing associated with the circuit.

17. The machine-readable storage medium of claim 16, wherein the operations further comprise generating a report based on the noise analysis, wherein the report includes information indicating whether a noise violation occurs in the noise analysis.

* * * * *